United States Patent Office 3,166,947
Patented Jan. 26, 1965

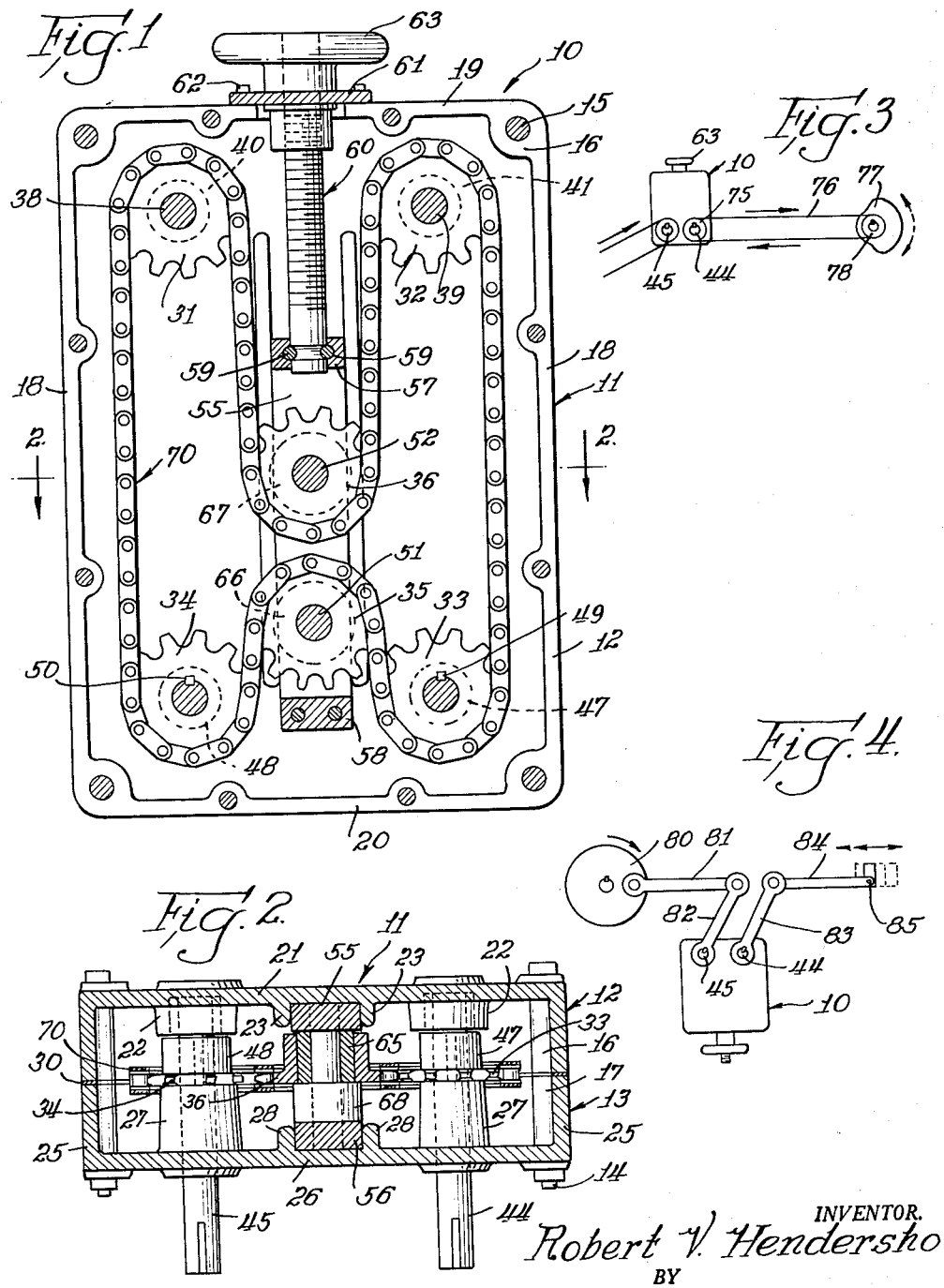

3,166,947
PHASE VARIATOR
Robert V. Hendershot, 1408 Main St., Evanston, Ill.
Filed Apr. 17, 1963, Ser. No. 273,715
2 Claims. (Cl. 74—216.5)

This invention relates generally to an improved means for varying the operational phase or cyclic position of a driven mechanism and more particularly concerns an improved device for effecting a shift in phase or cyclic position of selected elements in a driven mechanism.

In many instances it is desirable to shift the operational phase of certain control elements in a mechanism for the purpose of altering a given mechanical motion or timing of the mechanism. For example, in a cam driven mechanism it is often desirable to alter the position of a cam relative to its follower to produce related variations in the operation of an associated mechanism. In another instance, varying the end position of a crank arm stroke is employed for altering operational characteristics of related machinery, while in still other cases it is desirable to adjust the point of contact between members, as for example in printing presses where adjustment of the point of contact between type on a printing roller and the paper being printed is desired. These and numerous other instances of altering the operational phase and timing of a mechanism will readily occur to one skilled in the mechanical arts in particular; but for present purposes it is sufficient to recognize that a need exists and that devices are desired for producing positional shifting or phase variation of mechanically moving parts.

While a wide variety of devices has been presented in the past directed generally to accomplishing the above objectives, the need still exists for a simple, direct acting, and otherwise improved means for quickly and easily varying or shifting the operational positions of certain control elements in a mechanism, generally for the purpose of changing the operational timing of that mechanism. Such heretofore unsatisfied need is particularly apparent in mechanisms wherein for one reason or other it is desirable to effect a phase shift or timing change while the mechanism to be controlled is running, or while the parts thereof are in operational movement. It is to this latter end that the present invention is particularly directed.

In brief, the present invention embodies a simplified arrangement of rotatable sprocket wheels, six in number, in the preferred form illustrated herein, of which four are mounted on stationary spaced axes arrayed substantially at the four corners of a rectangular pattern and the remaining two of which are rotatably mounted on a shifting means for rectilinear movement therewith and relative to the other four sprocket wheels. An endless chain is trained about the six sprocket wheels to effect their simultaneous rotation about parallel axes within a suitable protective housing. Two of the four stationary sprocket wheels are idlers, a third one thereof is driven by an external power source or means, and the remaining one is a driver which rotatably drives a transfer shaft coupled to a member, such as a cam or crank arm, that is to be shifted in operational phase. The two sprockets associated with the shifting means are also idlers, and by moving their shiftable support the chain drive interconnecting the several sprockets is caused to move and thereby rotate all but the one driven sprocket, or stated in other words, to cause relative rotation between the driven and driver sprockets and the shafts with which they are associated. The imposed rotation of the one driver sprocket produces a corresponding movement or phase shifting of the control cam, crank arm, or other motion control member with which it is coupled. Since such operational shifting of the control member is produced solely in response to movement of the shifting means associated with the phase variating device of this invention, and is independent of the normal driving of the control member, the desired phase shifting of the latter may be carried on without interrupting normal operation of the machine or other mechanism with which it is associated.

The main object of this invention is to provide new and improved means for varying the relative cyclic positions of control elements in mechanical contrivances.

Another object of this invention is to provide new and improved mechanism for adjusting the operational phase and positioning of mechanical elements while the same are in operational movement.

A still further object of this invention is to provide a new and improved device for adjusting the timing of a mechanism by altering the operational position and relationship between a driven control member and a member or mechanism driven thereby.

The above objects, features and advantages of this invention will appear to those familiar with the art from the following detailed description of a preferred embodiment thereof, as illustrated in the accompanying drawings.

In the drawings:

FIGURE 1 is a front elevational view of the improved phase variator of this invention illustrating the internal arrangement of parts therein as the same appear with a cover portion of the housing enclosure therefor removed;

FIG. 2 is a cross-sectional view taken substantially at line 2—2 of FIG. 1 and looking in the direction of the arrows thereon;

FIG. 3 is a schematic illustration of a typical installation employing the phase variator of this invention for positional shifting of a control cam; and FIG. 4 is another schematic illustration similar to FIG. 3, illustrating positional shifting or phase of a crank arm according to this invention.

Turning now to the drawings, particularly FIGS. 1 and 2, it will be recognized therefrom that the phase variator of this invention, indicated generally by numeral 10, comprises a protective two-part housing 11, having a back cover portion 12 (see FIG. 2) and a front or cover portion 13; such two housing portions being held together by a plurality of transversely extending bolt connectors 14, 14 or the like which pass through both housing portions via openings 15 drilled through cast pad sections 16 and 17 of the respective housing portions. Essentially each of the housing portions 12 and 13 is formed as a rectangular box, as by known casting procedures; the back portion 12 including parallel elongated sidewall portions 18, 18, a transversely related upper end wall portion 19, and paralleling the latter a lower end wall portion 20. The several wall portions 18 through 20 are cross-connected by a transversely related back wall 21 having integrally cast therewith four projecting bearing bosses 22, 22 arrayed at the four corners of a substantially rectangular pattern. Such bosses project into the open interior of the box-like portion 12. The back wall 21 thereon is further distinguished by a pair of parallel spaced rib elements 23, 23 extending parallel to side walls 18, 18 and providing a sliding guideway, as will be explained more fully hereinafter.

The front housing portion 13 is substantially identical to the rear housing portion 12, having parallel sidewall portions 25, 25, upper and lower end wall portions (not shown) corresponding to wall portions 19 and 20 of the back housing portion, and a front cover wall 26 distinguished by four inwardly projecting bearing boss portions 27, 27 arranged to oppose the corresponding bearing boss portions 22, 22 of the rear housing portion 12. The boss portions 27, 27 differ in their axial extent from boss portions 22, however, in that they are somewhat longer as shown specifically in FIG. 2 of the drawings. The front cover wall 26 of the housing portion 13 is also equipped with a pair of parallel spaced guideway projecting ribs 28, 28, aligned parallel to sidewalls 25, 25 thereof and positioned to oppose the corresponding guideway ribs 23, 23 of the back cover portion.

In assembly, as will be readily appreciated, the two cover portions 12 and 13 fit matingly together in superposed registration so as to enclose a hollow interior space for the assembly of the working elements of the improved phase variator of this invention. In this regard the assembly of the two housing portions 12 and 13 is effected by means of the several holding bolts 14 as previously noted, with the several side and end walls of the two cover portions abutting. Desirably, such abutting faces of the side and end walls of the two housing portions are accurately machined so that by employing a suitable gasket 30 therebetween a fluid tight seal may be effected for the purpose of maintaining a bath or body of oil within the housing to lubricate the several moving elements therewithin.

Mounted within and supported principally by the housing back cover portion 12 are a plurality of chain sprocket wheels (six in number in the particular embodiment illustrated) numbered 31, 32, 33, 34, 35, and 36 in FIG. 1. It will be understood that the sprocket wheels 31 through 34 are arrayed substantially at the corners of a rectangular pattern as previously mentioned. The two sprocket wheels 31 and 32, which are located near the upper end of the housing, constitute rotatable idlers, mounted respectively on stub shafts 38 and 39. Each of the stub shafts 38 and 39 is supported between and by the opposing bearing boss projections 22 and 27 of the two housing portions 12 and 13 respectively, with the respective hub portions 40 and 41 of the sprockets 31 and 32 serving as spacer means to locate the teeth of the sprocket wheels 31 and 32 in substantially coplanar relationship, similar to the mounting arrangement for the lower disposed sprocket wheels 33 and 34, as illustrated in the cross-sectional view in FIG. 2.

Sprocket wheels 33 and 34 are similarly mounted on respectively associated shafts 44 and 45, each of which extends through and is rotatably supported by opposing boss portions 22 and 27, adjacent the lower end walls of the housing (see FIG. 1 of the drawings). As shown in FIG. 2, the stub shafts 44 and 45 project outwardly of the front cover wall 26, and sleeve bearing means 46 are provided within the bearing boss portions 22, 22 of the back cover portion 12 to rotatably support the same in conjunction with the support provided by the elongated bearing bosses 27, 27 of the front cover portion. The sprocket wheels 33 and 34 are formed with elongated hub portions of substantially cylindrical configuration, designated at 47 and 48 respectively, and, like the corresponding hub portions of the upper sprocket wheels 31 and 32, such serve to space the sprocket wheels between the related supporting boss portions 22, 27 for aligning the teeth thereon in substantially coplanar relationship. The sprocket wheels 33 and 34 are further keyed or otherwise affixed to their respective shafts 44 and 45 by respective key and keyway means 49 and 50. Thus sprocket wheels 33 and 34 are intended to, and in operation do, rotate with their respectively associated shafts.

Mounted in between the several sprocket wheels 31 through 34 are two shiftable idler sprockets 35 and 36 disposed on parallel spaced axes, one above the other, as defined by short stub shafts 51 and 52 which extend between and are affixed at their ends to an adjusting means comprising a pair of parallel spaced slide blocks 55 and 56. The blocks 55 and 56 respectively slide between and are guided by the parallel guide ribs 23, 23 associated with the rear cover portion 12, and ribs 28, 28, associated with the front cover portion 13. Such slide blocks 55 and 56 are held separated at their upper and lower ends by spacer members 57 and 58 which are joined thereto by pin means 59, 59. The upper spacer block 57 is also fastened by pin means 59, 59 to the lower end of a hand manipulated adjusting screw means 60 which projects upwardly therefrom and slidably passes through a suitable bearing block assembly 61, fastened by screw means 62, 62 to the upper end walls of the two assembled housing portions 12 and 13. A manually engageable wheel 63 is threaded to the upper end of the screw means 60 exteriorly of the bearing block assembly for manipulation by the operator.

The threaded association of the screw means 60 with the bearing wheel 63 is such that appropriate rotational movement of the latter serves to elevate or depress the screw means, the slide blocks 55, 56 attached thereto, and the related sprocket wheels 35 and 36.

As indicated previously, the two idler sprocket wheels 35 and 36 are rotatable on their respective shafts 51 and 52, and for that purpose a sleeve bearing 65 is inserted within their respectively related elongated hub portions 66 and 67 to provide bearing support therefor. Spacer collars 68 are also provided on shafts 51 and 52 between the slide block 56 and the two sprocket wheels 35 and 36 to assist in aligning the teeth of the latter in coplanar relationship with the teeth of the other sprocket wheels 31 through 34; such coplanar relationship and alignment being observable from FIG. 2 of the drawings. With this arrangement it will be understood that rectilinear movement of the adjusting slide means, particularly the two slide blocks 55 and 56, causes like rectilinear shifting movement of the two sprockets 35 and 36 carried thereby.

To couple the several sprocket wheels 31–36 for simultaneous rotation with or about their respective support shafts, a single endless link chain 70 is entrained thereabout to engage their toothed peripheries as will be seen by examining FIG. 1 of the drawings. With this arrangement rotational driving of any one of the sprocket wheels produces like rotational driving of the remaining sprockets. More specifically, the sprocket wheel 34 affixed or keyed to shaft 45 is to be regarded for present purposes as the driven sprocket; shaft 45 being coupled by a suitable driving system to an external driving source, such as an electric motor or the like. The adjacent sprocket wheel 33, by way of contrast, is to be considered for present purposes as the driver sprocket in the sense that rotational response thereof to the driving motion imparted to chain 70 upon rotation of sprocket 34 ultimately produces rotation of the take-off shaft 44 and following mechanism with which it is associated.

Turning now to the operation of the improved phase variator, rotational driving of the sprocket wheel 34 and its associated drive shaft 45 at a constant speed of rotation effects a corresponding constant rotational driving of the driver sprocket 33 and particularly its associated take-off shaft 44. As schematically represented in FIG. 3, coupling shaft 44, as by sprocket wheel means 75 and chain 76 to a rotatable control cam plate 77 which is associated with a secondary sprocket wheel 78, results in positive rotational driving of the cam plate. If now the hand operated adjustment wheel 63 of the phase variator 10 is operated to rectilinearly move the screw means 60, slide blocks 55 and 56, of the slide mechanism and the associated sprockets 35 and 36, the chain 70 will be moved to produce an effective rotation of the driver sprocket 33 relative to sprocket 34. Assuming for this purpose that sprocket wheel 34 is driven in a clockwise sense, as shown in FIG. 3, corresponding clockwise rotation of sprocket 33 will result. Elevation of sprocket wheels 35 and 36, by operating the screw means 60, will then produce an effective movement of the chain 70 in support or in addition to its normal driving movement as imposed by driven sprocket 34. While this imposed clockwise rotation does not affect the driven sprocket 34 which is positively affixed to move with the driven in-put shaft 45, it does produce an imposed or increased clockwise movement and phase adjustment of sprocket 33, its shaft 44, and cam plate 77 attached thereto. Conversely, depressing or lowering the adjusting means with the related idler sprockets 35 and 36 under the above outlined conditions will cause a slackening of the chain 70 between sprockets 33 and 35 and a tensioning thereof between sprockets 32 and 33 to produce a movement of the chain 70 over the several sprockets 31, 32, 33, 35 and 36 in reverse to the normal driving direction thereof. This results in an effective counterclockwise rotation of the driver sprocket 33 to produce a corresponding counterclockwise shift of the cam plate 77 in FIG. 3.

The amount of clockwise or counterclockwise rotation thus imparted to the cam plate by the corresponding upward or downward movement of the movable sprockets 35 and 36 will depend of course on the rectilinear transfer of the adjusting means and the diameter and number of teeth on the sprockets. While the number of teeth and diameter of the sprockets are susceptible to wide variation, it is nevertheless readily apparent that the vertical or rectilinear adjusting movement of the movable sprockets 35 and 36 produces a corresponding relative rotation between shafts 44 and 45 productive of a desired positional or phase adjustment of the cam means 77. This phase adjustment further can be successfully carried out by the improved phase variator of this invention while the chain means 70 and the several sprockets associated therewith are moving and while the associated mechanism, such as control cam 77, is being driven at its normal operating r.p.m. Thus the desirable objective of being able to phase shift an operating control member, such as cam plate 77, is readily achieved with this invention.

With particular reference to FIG. 4 and in light of the foregoing explanation respecting shifting of the rotatable cam member 77 in FIG. 3, it will be understood also that the adaptation of my new phase variator to a crank's oscillating motion is likewise obtainable. As seen in that figure, a rotatable drive member 80 coupled pivotally to a link 81 and crank 82 may be employed to oscillate the driven shaft 45 of the phase variator. Such oscillatory driving of shaft 45 produces a corresponding oscillation of the driver shaft 44. If shaft 44 is also coupled by a crank arm 83 and link means 84 to a sliding block 85, for example, rectilinear adjustment of the two movable sprocket wheels 35 and 36 in the manner explained above will produce a relative clockwise or counterclockwise rotation between shafts 44 and 45, resulting in a corresponding advance or retardation of end-of-stroke position for crank 83. Thus eventually the movable block 85 is adjusted in its throw positions. This variation in phase or motion for the movable block is readily useful to a desired phase alteration or timing change for mechanisms associated with the block 85 or crank 83. Thus the adaptation of the improved phase variator of this invention to oscillatory motion adjustment is readily apparent.

While the foregoing description is related to a preferred embodiment of the present invention as above set forth and illustrated in the accompanying drawings, it is readily apparent that numerous changes, modifications and substitutions of equivalents may be resorted to therein without necessarily departing from the spirit and scope of this invention. As a consequence it is not intended that the present invention be limited to the particulars of its herein described embodiment except as may appear in the following appended claims.

I claim:

1. In a device for shifting the operational position of a control member in a mechanism relative to its drive means, the combination comprising a fluid tight housing for containing a body of lubricating fluid, six coplanar sprocket wheels mounted within said housing for rotation on parallel spaced axes, four of said sprocket wheels being arrayed at the four corners of a substantially rectangular pattern and the remaining two sprocket wheels being disposed on parallel spaced axes located wholly between said four sprocket wheels and within the boundaries of said pattern, rectilinearly shiftable adjusting means having operating means therefor accessible exteriorly of said housing for reciprocating the same, said adjusting means supporting said remaining two sprocket wheels for simultaneous rectilinear shifting movement in like directions along a linear path constantly parallel to and between the rotational axes of said four sprocket wheels and within the boundaries of said pattern, a first one of said four sprocket wheels having positive driving connection with a drive means, a second one of said four sprocket wheels having driving connection with a control member whose operational position is to be regulated and the remaining two of said four wheels constituting idler wheels, and endless chain means trained about all six of said sprocket wheels to effect simultaneous rotation thereof in response to the rotational driving of said one sprocket wheel, said chain means passing along two opposite boundaries of said pattern, about the outer peripheries of said four wheels and in between said remaining two sprocket wheels, the rectilinear shifting of said two sprocket wheels causing an effective movement of said chain means about the axes of all of said sprocket wheels except the said first one thereof which is connected with the drive means so as to produce rotational movement of said second sprocket wheel relative to said first one sprocket wheel and correspondingly move the control member connected to the latter independently of the operating motion imparted thereto by the normal driving movement of said chain means effected with the rotation of said first one sprocket wheel.

2. The combination as set forth in claim 1 wherein said adjusting means comprises slide block means supporting said remaining two sprocket wheels, guide means engaging said block means and limiting movement of said slide block means to a rectilinear path, and adjusting screw means having manually engageable means exteriorly of said housing and connection with said slide block means and adapted to shift the latter rectilinearly.

References Cited by the Examiner
UNITED STATES PATENTS

| | | | |
|---|---|---|---|
| 2,185,079 | 12/39 | Hall | 74—242.11 X |
| 2,212,348 | 8/40 | Ludington | 74—242.8 |
| 2,352,797 | 7/44 | Miller | 74—217 |
| 2,894,405 | 7/49 | Carle | 74—242.14 X |

DON A. WAITE, *Primary Examiner.*